United States Patent

[11] 3,592,060

[72] Inventor Royce Jay Laverman
 South Holland, Ill.
[21] Appl. No. 793,789
[22] Filed Jan. 24, 1969
[45] Patented July 13, 1971
[73] Assignee Chicago Bridge & Iron Company
 Oak Brook, Ill.

[54] APPARATUS AND METHOD FOR MEASURING THE THERMAL CONDUCTIVITY OF INSULATING MATERIAL
9 Claims, 3 Drawing Figs.
[52] U.S. Cl. ..................................................... 73/15
[51] Int. Cl. ..................................................... G01n 25/20
[50] Field of Search .......................................... 73/15, 190

[56] References Cited
UNITED STATES PATENTS
2,475,138 7/1949 Hood, Jr. et al. .............. 73/15
3,279,239 10/1966 Arends et al. ................. 73/15

Primary Examiner—James J. Gill
Assistant Examiner—Herbert Goldstein
Attorney—Merriam, Marshall, Shapiro & Klose ABSTRACT: Apparatus for quickly determining the thermal conductivity of a material over a wide temperature range in a single test. The apparatus comprises a heat sink of metal of known heat capacity, a shell surrounding and spaced away from the metal heat sink providing a space in the shell for placing a sample material, the thermal conductivity of which is to be determined, essentially all around the metal heat sink, means for measuring the temperature of the metal heat sink, and means for measuring the temperature of the shell to thereby determine the temperature difference through the sample.

INVENTOR
Royce Jay Laverman
BY Merriam, Marshall, Shapiro & Klose
ATTORNEYS

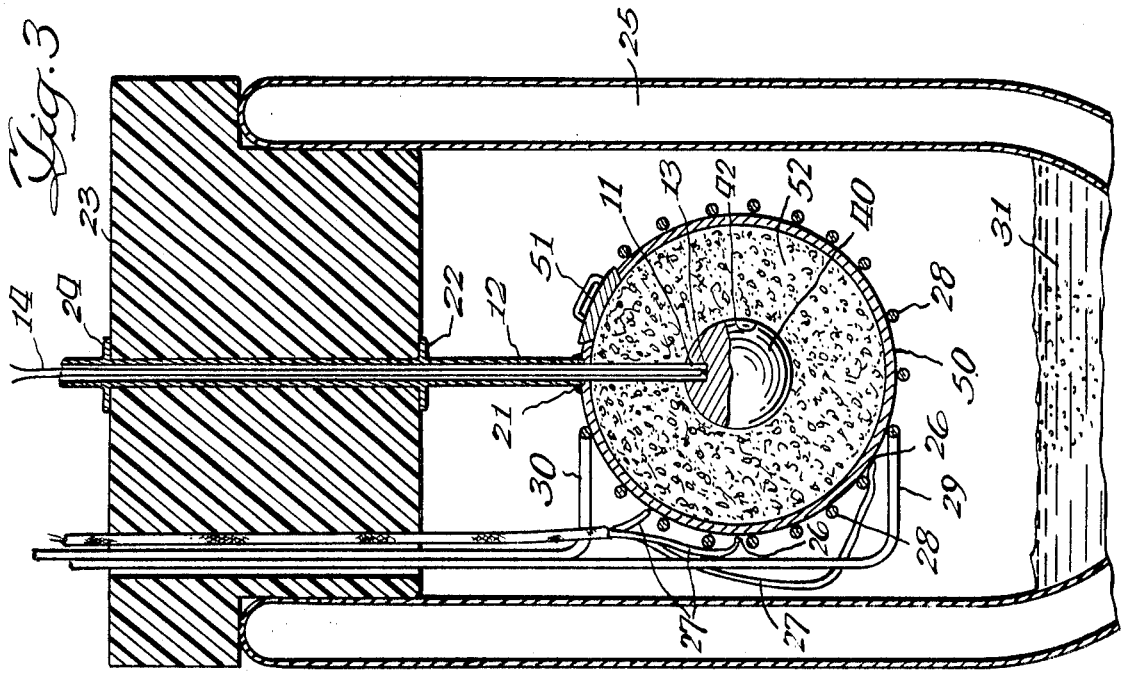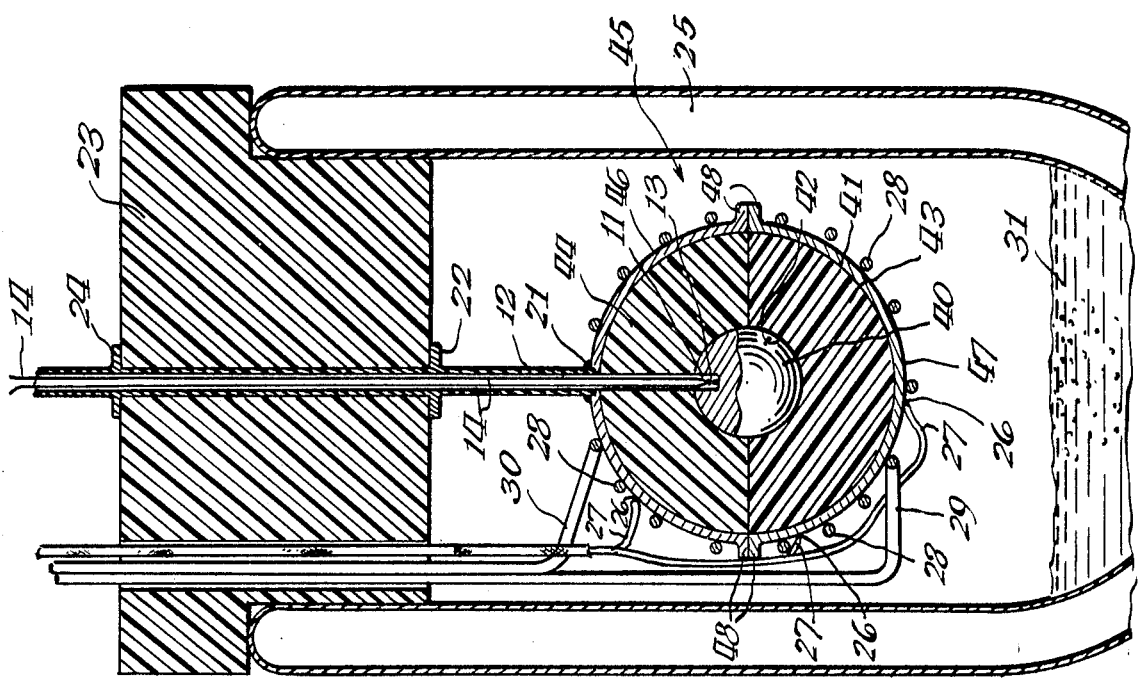

APPARATUS AND METHOD FOR MEASURING THE THERMAL CONDUCTIVITY OF INSULATING MATERIAL

This invention relates to measuring and testing materials. More particularly, this invention is concerned with apparatus and methods for determining the thermal conductivity of materials.

It is important in determining the suitability of materials for various uses that their thermal conductivity be known. This is particularly so for insulating materials, whether the object is to keep heat in or out of a certain area by means of insulation. By knowing the thermal conductivity of the insulating material, the conditions under which it will be used and the thermal protection needed, the amount and type of insulating material required for a job can be determined.

Because of the wide variety of insulating materials on the market and the large number added each year, it is important that there be available a means for determining accurately and rapidly the thermal conductivity of these materials. The manufacturer needs to determine the thermal conductivity for control purposes and the customer or user must often verify the value for safety and warranty purposes.

The standard ASTM guarded hot plate method (ASTM C-177-65) is presently generally used to determine the thermal conductivity of insulating materials. While accurate, it is a slow method, taking several hours for a single determination. In addition, the assembly required for the test is expensive and unwieldy.

There appears in the Journal of Cellular Plastics, Sept. 1966, pgs. 262 to 265, a paper by R. T. Dowd describing a method and apparatus for determining the thermal conductivity of cellular plastics. The method of Dowd however is restricted to determining a single value of thermal conductivity at essentially ambient temperature, and no other temperature, in a single test. Since the thermal conductivity of a material varies unpredictably at different temperatures, the thermal conductivity must be known for the temperature to which the material will be subjected. In the storage of liquefied gases, insulation is subjected to temperatures much lower than ambient temperature and for other uses to much higher temperatures. There is thus a need for apparatus and methods for rapidly determining the thermal conductivity of insulating materials over a wide temperature range.

According to the present invention there is provided apparatus for quickly determining the thermal conductivity of a material over a wide temperature range in a single test. The apparatus comprises a heat sink of metal of known heat capacity, a shell surrounding and spaced away from the metal heat sink providing a space in the shell for placing a sample material, the thermal conductivity of which is to be determined, essentially all around the metal heat sink, means for measuring the temperature of the metal heat sink, and means for measuring the temperature of the shell to thereby determine the temperature difference through the sample.

Also provided is the method of measuring the rate of heat transfer through a material for determining the thermal conductivity of the material, comprising placing a layer of substantially uniform thickness of a sample material around and in contact with a heat sink or known size and heat capacity and inside and in contact with a surrounding shell, bringing the metal heat sink and the shell initially to essentially the same low temperature, continuously raising the temperature of the shell above the temperature of the metal heat sink over the entire temperature range in which the thermal conductivity versus temperature relationship is desired, simultaneously measuring the temperature difference between the shell and the metal heat sink during measured time periods, and calculating the rate of heat transfer for the material.

The invention will now be described further in conjunction with the attached drawings, in which:

FIG. 2 is an elevational sectional view showing another embodiment of the invention in which the heat sink is a metal sphere; and FIG. 3 is an elevational sectional view showing another embodiment of the invention, but one similar to that in FIG. 2, for handling granular material.

So far as is practical, similar or identical elements which appear in more than one figure will be identified by the same number.

Figure 1:
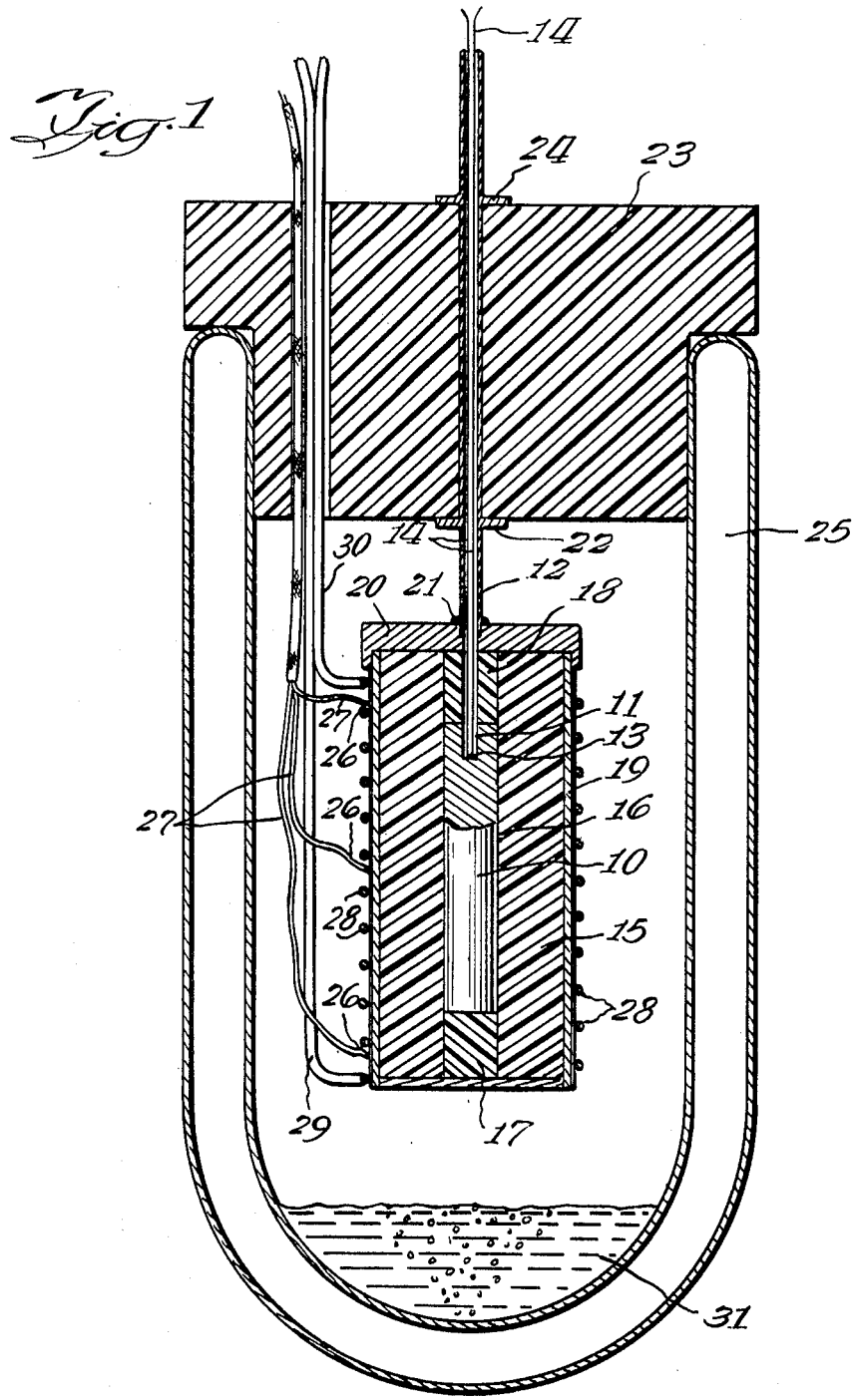
FIG. 1 is an elevational sectional view showing one embodiment of the apparatus provided by this invention using a cylindrical metal heat sink.

With reference to FIG. 1, the cylindrical metal heat sink 10, usually of copper, aluminum or silver, has a hole 11 in its upper end into which fits thermocouple 13. Thermocouple 13 is mechanically and thermally attached to heat sink 10. From the thermocouple 13, wires 14 run through tube 12 to suitable instruments for measuring the temperature of heat sink 10.

Surrounding heat sink 10 is cylinder 15, the thermal conductivity of which is to be determined. Cylinder 15 has an axial hole or bore 16 into which cylindrical heat sink 10 fits snugly. Hole 16 is closed at the bottom by plug 17 and at the top by plug 18. Each plug contacts an end of heat sink 10. The plugs 17 and 18 are generally as long as the cylinder 15 is thick, measuring from the surface of hole 16 to the outer surface of the cylinder. Plugs 17 and 18 are usually of the same material as cylinder 15 but they can be made of some other material, usually having insulating properties. However, a different correction factor would have to be calculated, as later explained, for each type of plug material so it is best to standardize on one material for the plugs and use it for all testing.

Metal shell 19 surrounds cylinder 15 and is in surface contact therewith along the bottom and sides. Shell 19 is advisably made of copper, silver or aluminum or some other material with good heat conductivity which will aid in achieving a uniform temperature on cylinder 15. Cover 20 of metal spans the top of shell 19 and is detachably connected to the shell. Tube 12 has its lower end fixed in cover 20 by adhesive 21. The means of connection must provide good thermal contact between shell 19 and cover 20. One means of achieving both good thermal contact, yet ease of detachment, is to use a low temperature melting metal alloy such as Rose metal as a bonding material. Washer or ring 22 is joined to tube 12 and rests against lid 23. Similarly, washer or ring 24 is joined to tube 12 and rests against lid 23. In this way, lid 23 when placed on top of vacuum bottle 25 suspends the shell 19, and elements therein, inside the vacuum bottle. Lid 23 can be insulating cellular foam or some other suitable material.

The temperature on the exterior surface of cylinder 15 is measured by one or more thermocouples 26 which are joined by wires 27 to suitable instruments for recording temperatures. Surrounding shell 19 are heater wires 28 wound therearound and joined to wires 29 and 30 at each end. By means of heater wires 28, heat can be applied to shell 19 and the temperature raised continuously from some initial value. The thermal conductivity of the material of cylinder 15 can thus be determined in this way for elevated temperatures as well as ambient and lower temperatures.

Lower starting temperatures are achieved by placing a liquefied gas 31, such as nitrogen, helium, oxygen or argon, in vacuum bottle 25 and letting it evaporate to cool the shell 19, the specimen 15, and the heat sink 10 to some uniform initial value. Upon achieving this initial value, the liquefied gas is allowed to evaporate and the temperature of shell 19 is continuously raised by a combination of heat entry into the vacuum bottle from the environment and heat supplied by heater wires 28.

In determining the thermal conductivity of a material, heat transfer must be measured on an area at right angles to the direction in which the heat flows. The structure of FIG. 1 meets this requirement since the surface of heat sink 10 is at right angles to heat which will penetrate cylinder 15.

The apparatus of FIG. 2 provides another embodiment of the invention. In this embodiment, the heat sink is sphere or ball 40 having hole 11 into which thermocouple 13 fits. The material to be tested is in the form of a sphere 41 having a central spherical hole or void 42. Sphere 41 is formed of a lower hemisphere 43 and an upper hemisphere 44. Upper hemisphere 44 can be divided into quarterspheres if necessary or advisable, to facilitate placing the material in spherical shell 45. Spherical shell 45 of metal is made in two or more pieces to aid in placing the material to be tested around spherical heat sink 40. Specifically, as shown in FIG. 2, shell 45 has an upper hemisphere 46 and a lower hemisphere 47, each of which has flanges 48 which mate together and are detachably joined by suitable fastening means.

FIG. 3 shows still another embodiment of the invention which is similar in many respects to the embodiment shown in FIG. 2. The structure of FIG. 3, however, uses a spherical shell 50, such as of copper, having port cover 51 which is removably attached to the shell. Spherical heat sink 40 is surrounded by a free flowing granular or particulate material 52 which occupies the space inside of shell 50. The granular material 52 is put in the shell 50 by removing cover 51 and pouring in the material. After the thermal conductivity of granular material 52 has been determined it is poured out through the opening obtained by removing cover 51. It is, of course, obvious that the structure of FIG. 1 lends itself well to testing the thermal conductivity of granular material as well as large solids.

In each of the embodiments of FIGS. 2 and 3, spherical heat sink 40 is concentrically positioned in their respective shells 45 and 50. In this way heat transfer through the material to be tested is at right angles to the surface of the heat sink.

Apparatus such as that described allows the rapid determination in one test of the thermal conductivity of a material at various temperatures extending from the cryogenic range to above ambient conditions. An entire thermal conductivity versus temperature curve for a given insulating material over the temperature range from $-320°$ F. to $+200°$ F. can be determined in approximately eight working hours using the testing equipment herewith provided.

In addition to supporting the apparatus from the lid 23, tube 12 can be used to either change the type of gas present in the test specimen space or control the pressure of the gas present in the test specimen space at some value either above or below atmospheric pressure.

In practicing the process of this invention, the material to be tested is cut, if necessary, to fit into the supporting shell and around the heat sink. The outside boundary of the test specimen is kept under a uniform temperature by enclosing it in the shell, advisably one having a high thermal conductivity, such as copper. Thermocouples are placed on the internal heat sink and on the shell. The entire device is cooled down to some low temperature and held there until the heat sink and the shell are approximately at the same temperature. At this point, the cold environment is removed and the sample is allowed to warm slowly to ambient or above conditions. This may be controlled by the use of the heater winding placed around the shell. When the heating of the insulation sample is sufficiently slow, and the heat sink on the inside is sized properly, the temperature profile through the insulation material is sufficiently close to the steady state type of profile that one can assume a quasi-steady condition exists in the insulation sample, and make calculations of the thermal conductivity of the sample based on this assumption. The outside temperature is generally in the order of $20°$ to $50°$ warmer than the interior heat sink temperature. By monitoring both the outside and interior temperatures of the test specimen as a function of time, it is possible at each instant in time to calculate the thermal conductivity of the test material at the prevailing mean sample temperature.

To calculate the thermal conductivity, the basic heat equation as follows is used:

$$dq/ct = kAdT/dx$$

where $dq/dt$ = heat transfer rate = B.T.U./hr
$A$ = area of surface = ft.$^2$
$T$ = temperature = $°$ F.
$X$ = distance perpendicular to A $k$ = proportionality constant, thermal conductivity = B.t.u. inch/hr. ft$^2$ $°$ F.

$dq/dt$ is approximated by $\Delta q/\Delta t$, and can be computed thusly, $$\Delta q/\Delta t = M\,Cp\,(T_1-T_0)/(t_1-t_0)$$

where $M$ = mass of heat sink = 1bm
$C_p$ = heat capacity of heat sink = B.t.u./1bm $°$ F.
$T_t$ = temperature of the heat sink at time $t_t$ = $°$ F.
$T_0$ = temperature of the heat sink at time $t_0$ = $°$ F.
$(t_1-t_0)$ = elapsed time = hr It may be necessary to introduce a correction factor peculiar to the geometry of the heat sink and ancillary equipment used in the test. Any correction factor, however, should be a constant for a particular testing device regardless of the material tested in the device. The correction factor can be readily determined using a test material, such as a cellular insulating foam, of known $k$-factor and running the described process using the test apparatus of this invention. The material of known $k$-factor can be obtained from the United States National Bureau of Standards. Alternatively, the conventional guarded hot plate method can be used to determine the $k$-factor, the results compared with those obtained using the apparatus of this invention and the correction factor calculated from such data.

The foregoing detailed description has been given for clearness of understanding only, and no unnecessary limitations should be understood therefrom, as modifications will be obvious to those skilled in the art.

I claim:

1. The method of measuring the rate of heat transfer through a material for determining the thermal conductivity of the material comprising:

placing a layer of substantially uniform thickness of a sample material around and in contact with an essentially solid heat sink of known size and heat capacity having an external surface, and inside and in contact with the internal surface of a surrounding metal shell to fill the space between the surface of the heat sink and the surface of the shell;

the surface of the heat sink being equally spaced from, and perpendicular to, the surface of the shell;

bringing the metal heat sink and the shell to essentially the same temperature;

raising the temperature of the shell above the temperature of the metal heat sink;

simultaneously measuring the temperature of the shell and the metal heat sink during measured time periods; and calculating the rate of heat transfer for the material.

2. The method of claim 1 in which the temperature of the shell is raised by means of a heating element mounted externally on the shell.

3. An apparatus for use in determining the thermal conductivity of a material comprising:

an essentially solid heat sink of metal of known heat capacity with an external surface;

a shell surrounding, and having an internal surface equally spaced in a perpendicular direction away from, the metal heat sink surface thus providing a space which can be filled with a sample material, the thermal conductivity of which is to be determined, all around and in contact with the metal heat sink and in contact with the shell;

means for inducing a temperature differential between the shell and the heat sink with the shell at a higher temperature than the heat sink; and means for measuring the temperature of the metal heat sink, and means for directly measuring the temperature of the shell, during measured time periods, whereby using such measurements the thermal conductivity of the material can be calculated.

4. Apparatus according to claim 3 in which the metal heat sink is spherical and the shell is spherical.

5. Apparatus according to claim 3 in which the heat sink and shell are cylindrical.

6. An apparatus for use in determining the thermal conductivity of a material comprising:
   an essentially solid heat sink of metal of known heat capacity with an external surface;
   a shell surrounding, and having an internal surface equally spaced in a perpendicular direction away from, the metal heat sink surface thus providing a space to be filled with a sample material, the thermal conductivity of which is to be determined, all around and in contact with the metal heat sink and in contact with the shell;
   an external heating means mounted on the shell to apply heat to the shell;
   means for measuring the temperature of the metal heat sink and means for directly measuring the temperature of the shell, during measured time periods, to thereby determine the temperature difference through the sample whereby using such measurements the thermal conductivity of the material can be calculated.

7. Apparatus according to claim 6 in which the heat sink and shell are cylindrical.

8. Apparatus according to claim 6 in which the heat sink and shell are spherical.

9. Apparatus according to claim 8 in which the shell is positioned in a container for holding a cooling medium.